March 31, 1953     J. H. GRUVER     2,633,075
PIVOTALLY MOUNTED PRINTING MEANS IN SALES RECORDER
Filed May 19, 1950     7 Sheets-Sheet 1
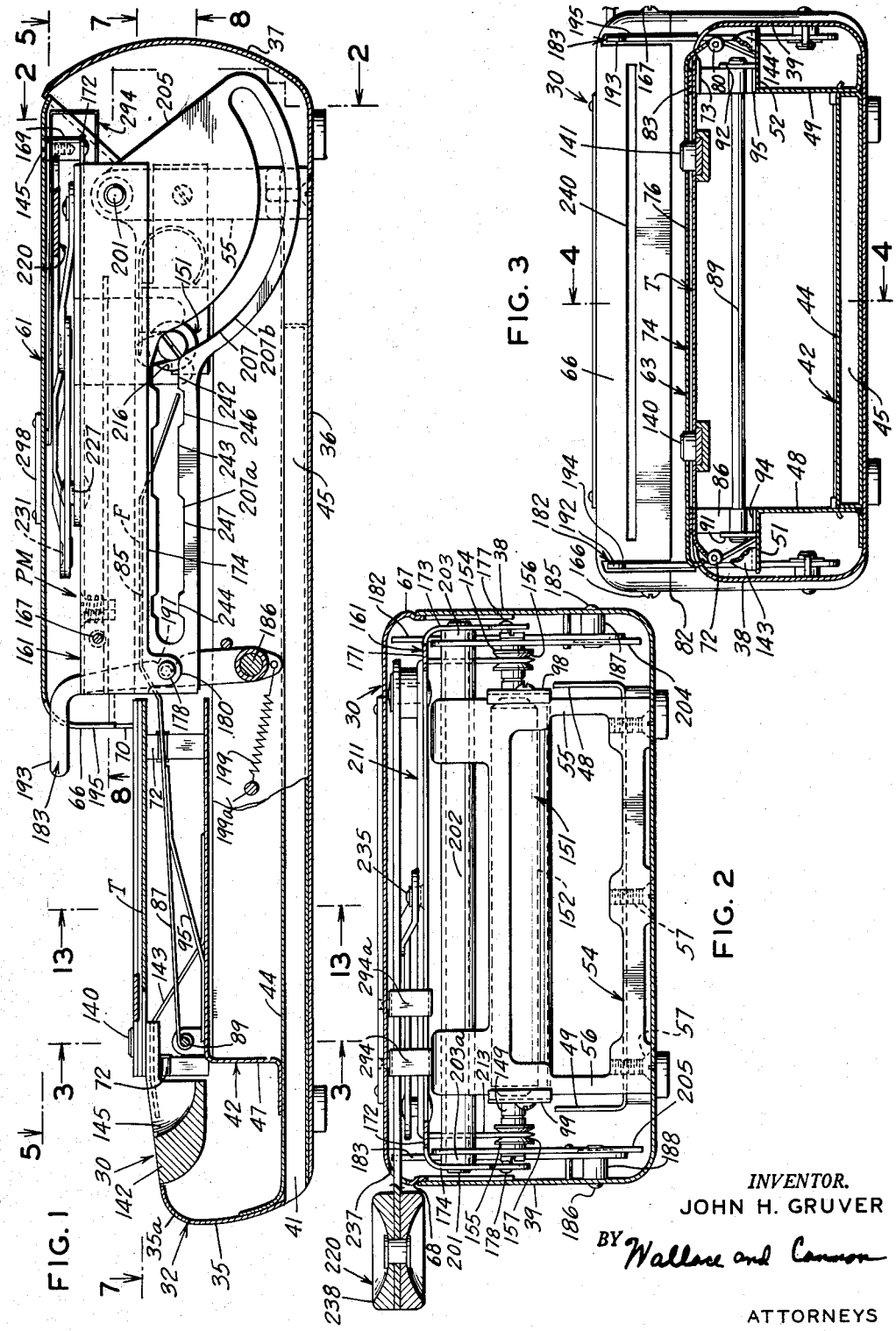
INVENTOR.
JOHN H. GRUVER
BY Wallace and Cannon
ATTORNEYS March 31, 1953  J. H. GRUVER  2,633,075
PIVOTALLY MOUNTED PRINTING MEANS IN SALES RECORDER
Filed May 19, 1950  7 Sheets-Sheet 2

INVENTOR.
JOHN H. GRUVER
BY Wallace and Cannon
ATTORNEYS

March 31, 1953  J. H. GRUVER  2,633,075
PIVOTALLY MOUNTED PRINTING MEANS IN SALES RECORDER
Filed May 19, 1950  7 Sheets-Sheet 3

INVENTOR.
JOHN H. GRUVER
BY Wallace and Cannon
ATTORNEYS

March 31, 1953 J. H. GRUVER 2,633,075
PIVOTALLY MOUNTED PRINTING MEANS IN SALES RECORDER
Filed May 19, 1950 7 Sheets-Sheet 4
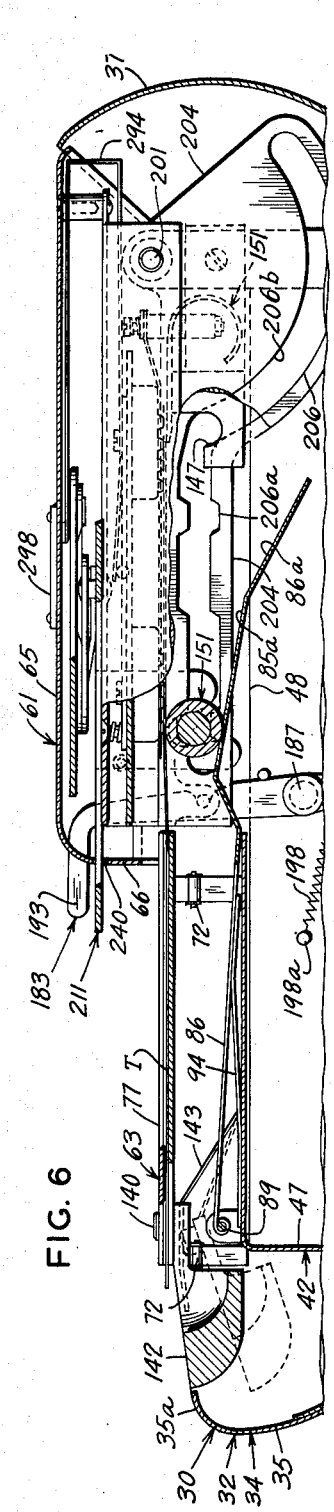
FIG. 6
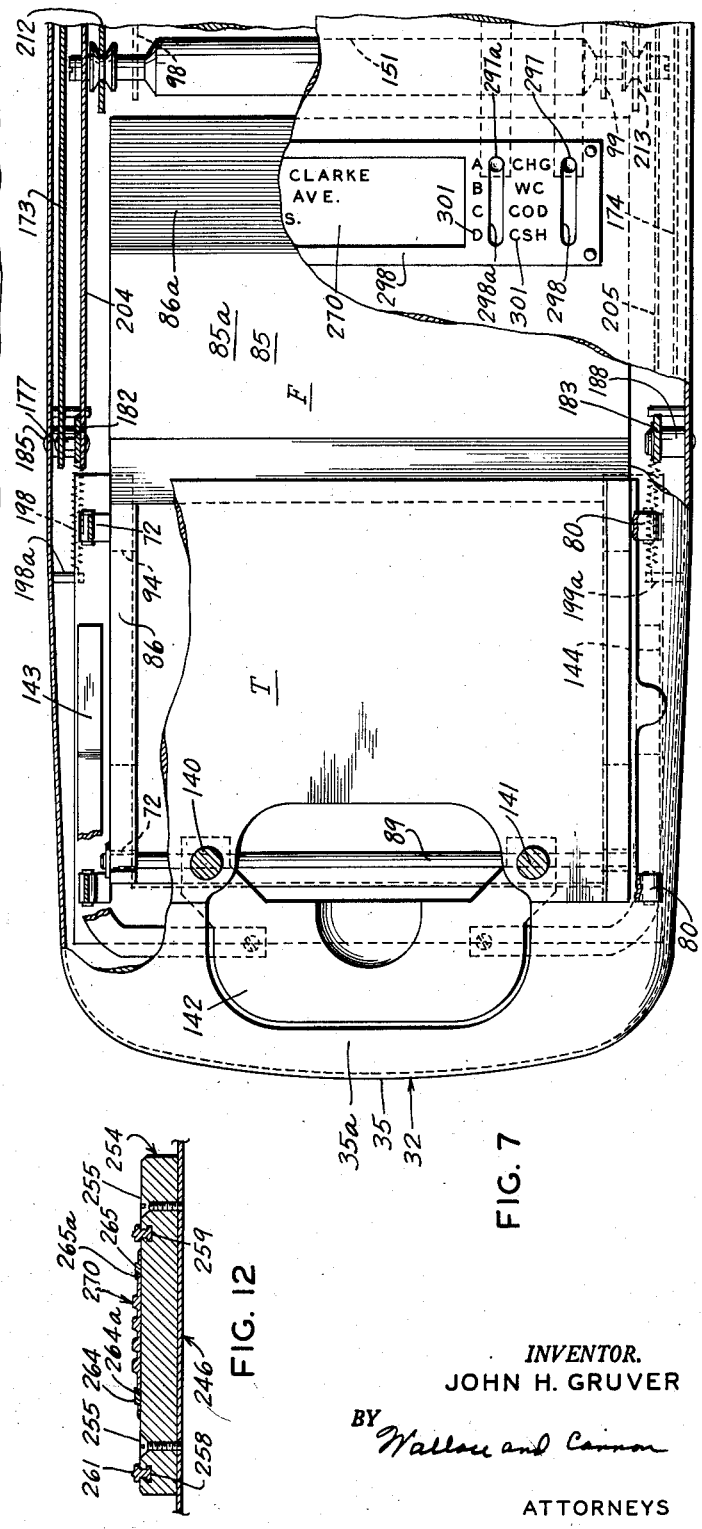
FIG. 7
FIG. 12
INVENTOR.
JOHN H. GRUVER
BY
ATTORNEYS March 31, 1953 J. H. GRUVER 2,633,075
PIVOTALLY MOUNTED PRINTING MEANS IN SALES RECORDER
Filed May 19, 1950 7 Sheets-Sheet 5
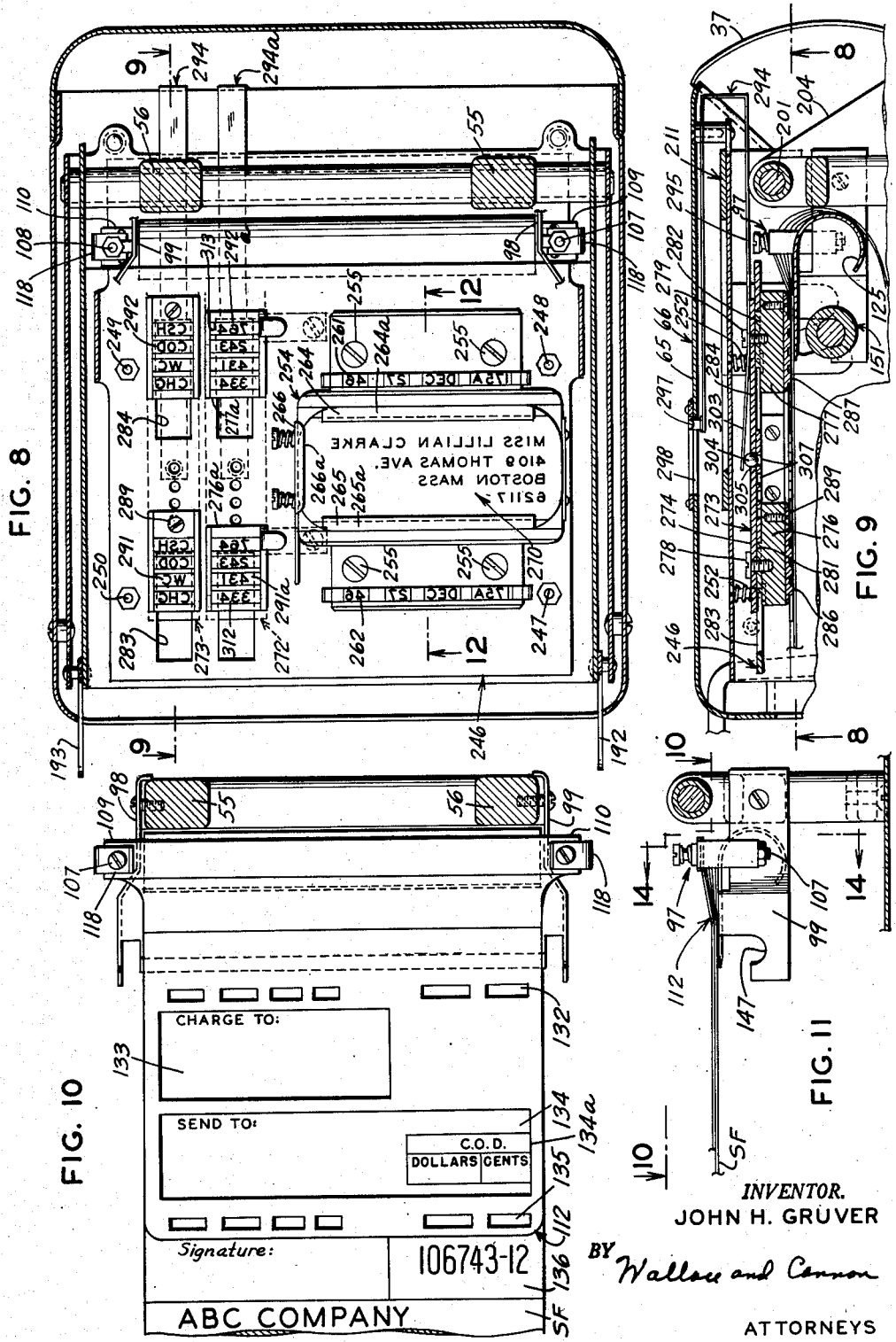
INVENTOR.
JOHN H. GRUVER
BY Wallace and Cannon
ATTORNEYS March 31, 1953  J. H. GRUVER  2,633,075
PIVOTALLY MOUNTED PRINTING MEANS IN SALES RECORDER
Filed May 19, 1950  7 Sheets-Sheet 6
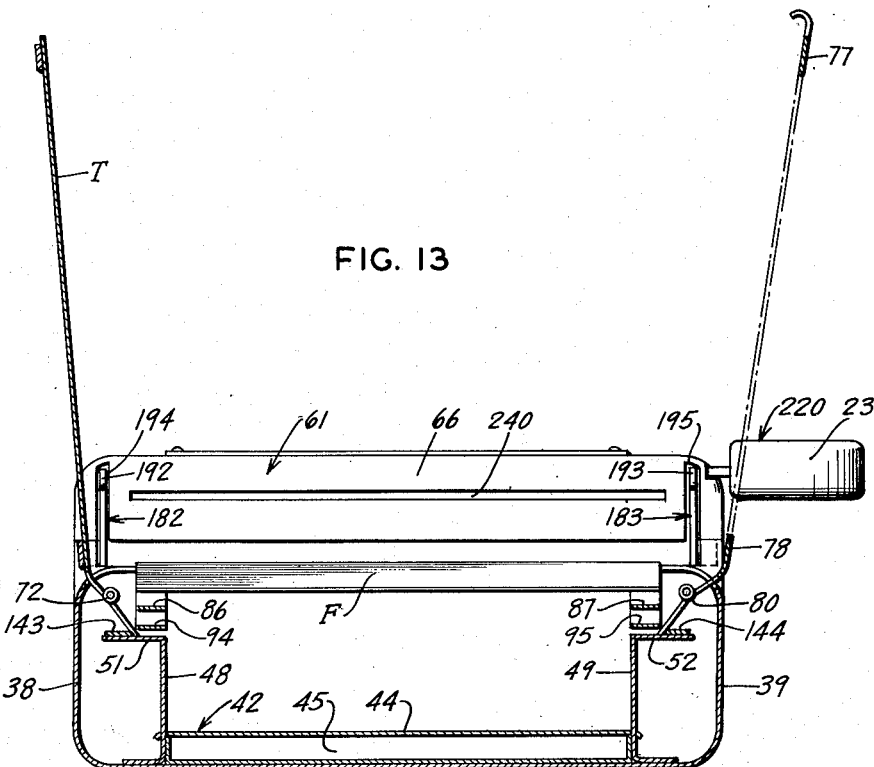
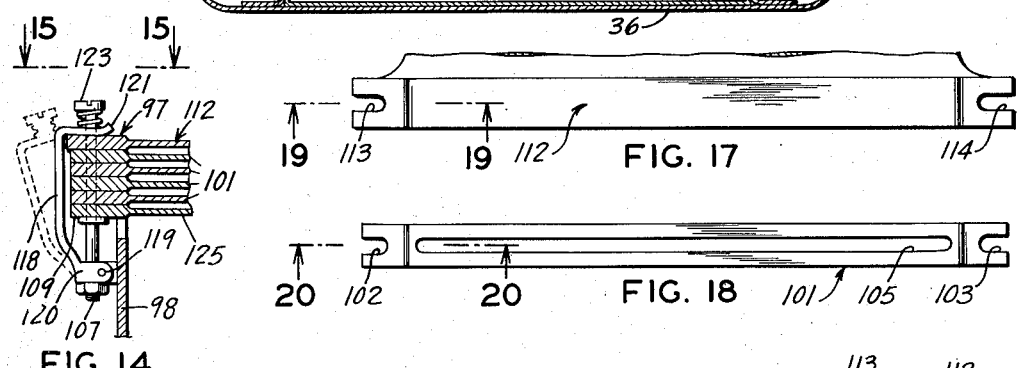
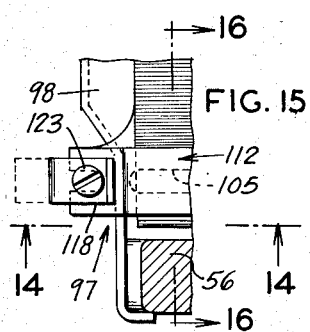
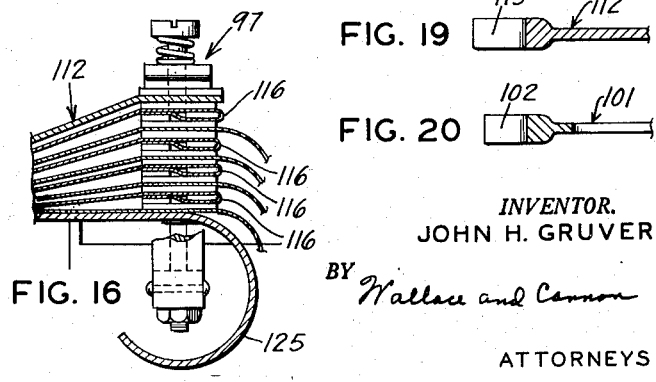
INVENTOR.
JOHN H. GRUVER
BY *Wallace and Cannon*
ATTORNEYS Patented Mar. 31, 1953

2,633,075

UNITED STATES PATENT OFFICE 2,633,075

PIVOTALLY MOUNTED PRINTING MEANS IN SALES RECORDER

John H. Gruver, Cleveland Heights, Ohio, assignor to Addressograph-Multigraph Corporation, Wilmington, Del., a corporation of Delaware Application May 19, 1950, Serial No. 163,020

7 Claims. (Cl. 101—56)

This invention relates to sales recorders and more particularly to sales recorders of the type particularly well adapted to be used in producing a combination printed and written record of a sales transaction.

A primary object of my invention is to enable a sales recorder of the aforementioned type, and having a hinged cover, to be constructed in such a manner that novel printing mechanism may be disposed in the cover in a novel and expeditious manner.

A further object is to enable novel writing tables to be embodied in a sales recorder of the aforementioned type for supporting sales slips and the like in a novel manner for the reception of written information thereon.

An object ancillary to the foregoing is to afford a sales recorder embodying a novel flexible table.

A further object is to enable a sales recorder of the aforementioned type to be constructed in such a manner that a supply of sales slips may be housed therein and the individual sales slips may be successively disposed in a novel manner in data-receiving position relative to the writing tables and the printing mechanism embodied in the sales recorder.

Yet another object is to provide a novel sales recorder of the type adapted to support a printing device in the hinged cover thereof for printing pertinent data on predetermined areas of a sales slip or the like, disposed in operative position over the table embodied in the sales recorder; and wherein a platen roller is moved, during a printing operation of the sales recorder, between the table and the sales slip to thereby press the sales slip into impression receiving relation to the printing device carried by the cover.

An object ancillary to the foregoing is to afford a sales recorder of the aforementioned type wherein the table on which the sales slips are disposed is flexible and is constituted and arranged in a novel and expeditious manner in the sales recorder, whereby the platen roller, during the aforementioned movement between the table and the sales slip, flexes the table downwardly from the cover.

A further object is to enable a novel sales recorder of the aforementioned type to be constructed in such a manner that printing devices may be readily changed and adjusted in the cover of the sales recorder.

Yet a further object of my invention is to enable a sales recorder of the aforementioned type to be constructed in such a manner that printing devices and actuating mechanism for a printing operation may all be embodied in the cover of the device.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a longitudinal sectional view of a sales recorder embodying the principles of my invention;

Fig. 2 is a sectional view taken substantially on the line 2—2 in Fig. 1;

Fig. 3 is a sectional view taken substantially on the line 3—3 in Fig. 1;

Fig. 6 is a fragmentary sectional view taken substantially on the line 6—6 in Fig. 5, this view being similar to Fig. 1 but showing the parts of my novel sales recorder in different position of operation;

Fig. 7 is a fragmentary detail sectional view taken substantially on the line 7—7 in Fig. 1;

Fig. 8 is a sectional view taken substantially on the line 8—8 in Fig. 1;

Fig. 9 is a fragmentary sectional view taken substantially on the line 9—9 in Fig. 8;

Fig. 10 is a sectional view taken substantially on the line 10—10 in Fig. 11;

Fig. 11 is a detail view of a portion of the mechanism shown in Fig. 9;

Fig. 12 is a detail sectional view taken substantially on the line 12—12 in Fig. 8;

Fig. 13 is a detail sectional view taken substantially on the line 13—13 in Fig. 1 but showing parts of my novel sales recorder in different operative position;

Fig. 14 is a detail sectional view taken substantially on the line 14—14 in Fig. 11;

Fig. 15 is a detail sectional view taken substantially on the line 15—15 in Fig. 14;

Fig. 16 is a detail sectional view taken substantially on the line 16—16 in Fig. 15;

Fig. 17 is a detail plan view of a portion of the mechanism shown in Fig. 14;

Fig. 18 is a detail plan view of another portion of the mechanism shown in Fig. 14;

Fig. 19 is a detail sectional view taken substantially on the line 19—19 in Fig. 17;

Fig. 20 is a detail sectional view taken substantially on the line 20—20 in Fig. 18.

Figure 4:
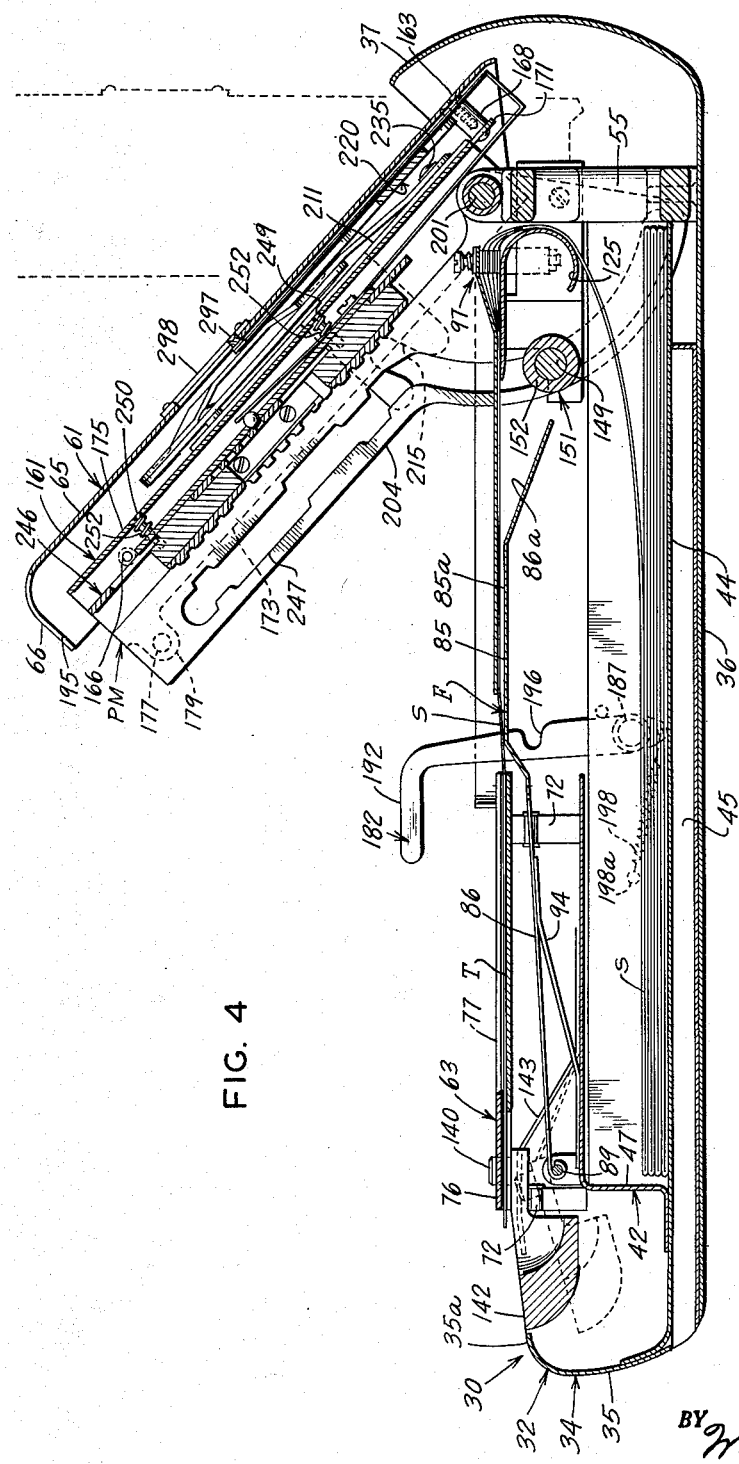
Fig. 4 is a longitudinal sectional view taken substantially on the line 4—4 in Fig. 3, but showing the cover in partially raised position.

The sales recorder 30 comprises, in general, a casing or housing 32, Figs. 1 and 4, having printing mechanism PM for printing certain data on sales slips, and having a relatively stationary writing table T and a flexible writing table F for supporting the sales slips being printed in such a position that a sales-clerk may readily enter certain written information regarding each sale; the housing 32 being so constructed and arranged that a supply of sales slips S may be housed therein and the individual sales slips successively disposed in data-receiving position relative to the printing mechanism PM and tables T and F, all of which will be discussed in greater detail hereinafter.

The housing 32 includes a body portion 34 having a front wall 35, a bottom wall 36, a rear wall 37 and two side walls 38 and 39, Figs. 1, 3 and 4. As is best seen in Figs. 1 and 4, the front wall 35 of the body member 34 is open to afford a slot 41 extending along the lower edge portion thereof. A box 42 having a bottom wall 44 is mounted in the body portion 34 of the housing 32 in spaced relation to the bottom wall 36 thereof to thereby afford a chamber 45 between the bottom wall 36 of the housing 32 and the bottom wall 44 of the box 42 in which copies of sales slips which have been filled out may be stored as will be discussed in greater detail hereinafter.

The box 42, in addition to the bottom wall 44 comprises a front wall 47 and two side walls 48 and 49, each projecting upwardly from the bottom wall 44. The upper end portions of the side walls 48 and 49 project outwardly therefrom to afford flanges 51 and 52 thereon, respectively, Fig. 3. Thus, it will be seen that the box 42 is open both at the top and at the rear end thereof. Adjacent to the rear end of the box 42, and within the body portion 34 of the housing 32, a supporting bracket 54 including two upright supporting posts 55 and 56, Figs. 1, 2 and 4, are mounted on the bottom wall 36 of the housing 32 and are secured in the aforementioned upright position by suitable means such as screws 57, these posts 55 and 56 affording supporting means on which a cover 61 is hingedly mounted, as will be discussed in greater detail presently.

The cover 61, as is best seen in Figs. 1 and 4, is disposed over only the rear end portion of the body 34 of the housing 32, another cover 63 being mounted on the front end portion of the body member 34, as will be discussed in greater detail presently.

Figure 5:
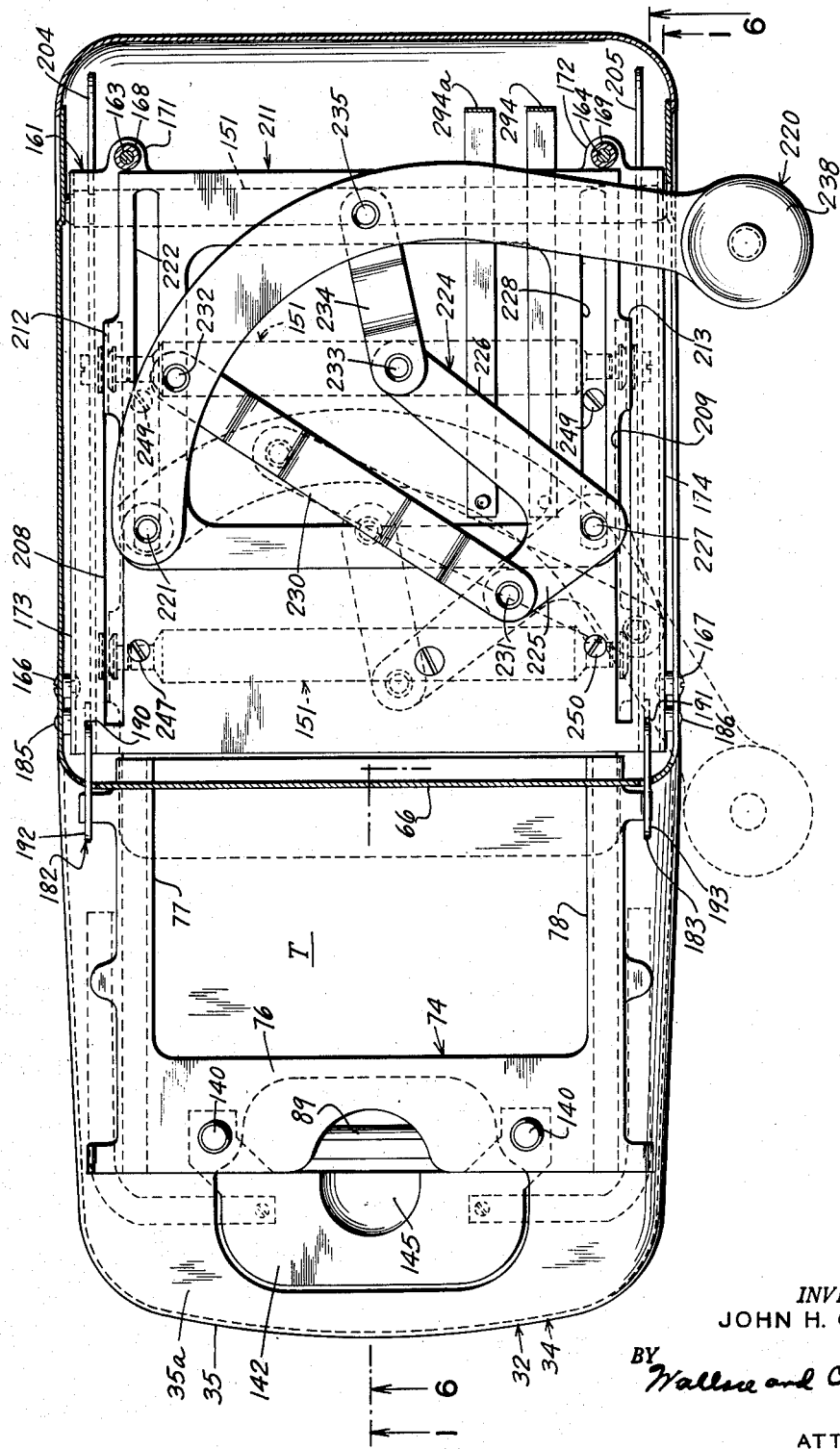
Fig. 5 is a sectional view taken substantially on the line 5—5 in Fig. 1.

The rear cover 61 comprises a top wall 65, a front wall 66, and two side walls 67 and 68, Figs. 1, 2 and 4, the walls of the cover 61 being so arranged that when the cover 61 is disposed in normally closed position as shown in Fig. 1, the lower edge portion of the front wall 66 is disposed above, and in spaced relation to, the rear edge portion of the table T to thereby afford a slot 70 extending across the full width of the front wall 66 along the lower edge thereof. As is best seen in Figs. 2, 3 and 5, when the cover 61 is disposed in closed position, the side walls 67 and 68 are disposed in close-fitting relation to the adjacent upper edge portions of the side walls 38 and 39, respectively, of the body portion 34 of the housing 32. As is best seen in Figs. 1 and 4, the rear wall 37 of the body 34 of the housing 32 is substantially arcuate shaped, being concave inwardly and the rear edge of the top wall 65 and the side walls 67 and 68 of the cover 61 are so disposed relative to the rear wall 37 of the body 34 that when the cover 61 is moved between closed and open positions shown in Figs. 1 and 4, respectively, the aforementioned rear edges of the top wall 65 and the side walls 67 and 68 swing inwardly of the rear wall 37 of the body portion 34.

The front cover 63 comprises the substantially flat table member T disposed in substantially horizontal position and pivotally mounted by two hinges 72 on the flange 51 of the box 42, the table T, when in the normally lowered or closed position shown in Fig. 3, extending across the top of the front end portion of the body member 34 of the housing 32 between the side walls 38 and 39 thereof and extending between the front wall 66 of the rear cover 61 and an inwardly turned flange 35a on the front wall 35 of the body member 34, and rests on a flange 73 on the side wall 39 of the housing 32. The other portion of the front cover 63 comprises a frame member 74, Figs. 1, 3 and 5, having a front leg 76 and two rearwardly projecting legs 77 and 78 mounted in parallel spaced relation to each other on opposite end portions of the front leg 76, Fig. 5, the legs 76—78 of the frame member 74 defining a substantially U-shaped opening open toward the rear of the housing 32, Fig. 7. The frame member 74 is pivotally connected by two hinges 80, Figs. 3 and 7, to the flange 52 on the box 49. Thus, it will be seen that when the front cover 63 is disposed in normal, closed position, the table T is disposed in substantially horizontal position, resting on the flange 73, and the frame member 74 is disposed in overlying position relative to the table T. Two guide plates 82 and 83, Figs. 3 and 13 are mounted on the longitudinal edge portions of the table T between the top surface of the table T and the frame member 74, to thereby hold the table T and the frame member 74 is spaced relation to each other and afford guideways between which the sales slips S may be moved in the operation of the sales recorder 30 as will be discussed presently.

The flexible table F having a body portion 85 and two substantially parallel leg portions 86 and 87, Figs. 3 and 4, is mounted in the body portion 34 of the housing 32 with one end portion of the legs 86 and 87 pivotally mounted on a rod 89 mounted in brackets 91 and 92 on the flanges 51 and 52 adjacent to the hinges 72 and 80, respectively. The body portion 85 of the flexible table F comprises a substantially flat normally horizontally disposed table top portion 85a connected at one edge to the ends of the legs 86 and 87 opposite the ends mounted on the rod 89, and an inwardly extending flange 86a connected to the other edge of the table top portion 85a. Two leaf-springs 94 and 95, Figs. 1, 4 and 13 are mounted on the flanges 51 and 52 of the box 42 and project upwardly and rearwardly therefrom into engagement with the legs 86 and 87, respectively, of the flexible table F to thereby resiliently hold the body portion 85 of the flexible table F in upwardly projecting position rearwardly of, and substantially in alignment with, the table T. As will be discussed in greater detail hereinafter, the flexible table F affords a supporting table for sales slips disposed in printing position in the sales recorder 30, during such time as a printing operation is not being performed thereon.

A carbon holder 97, Figs. 4, 9, 11 and 14, is mounted on a pair of brackets 98 and 99, Figs. 2 and 11, and comprises a plurality of elongated carbon-holder bars 101 having slots 102 and 103 formed in the opposite ends thereof and having centrally disposed longitudinally extending slots 105. Two bolts 107 and 108 are mounted in and project upwardly through flanges 109 and 110 on the brackets 98 and 99, respectively, and the carbon holder bars 101 are normally disposed in nested relation on the flanges 109 and 110 with the bolts 107 and 108 extending through the openings 102 and 103, respectively. A carbon guard or plate 112, Figs. 9, 11, 14 and 17, having slots 113 and 114, Fig. 17, corresponding to the slots 102 and 103 in the carbon holder bars 101, formed in the opposite side edges of one end portion thereof, is mounted on the top carbon holder bar 101 with the bolts 107 and 108 disposed in the slots 113 and 114, respectively, and extends forwardly from the carbon holder 97 to overlie and protect the portions of the sales slips adjacent to the portions to be printed, as will be discussed in greater detail presently.

As is best seen in Figs. 14, 16 and 18, the end portions of the carbon holder bars 101 and the guard plate 112 are somewhat thicker than the central portions thereof, so that the central portion of the bars 101 are disposed in parallel spaced relation to each other when the bars 101 are mounted on the bolts 107 and 108. Thus, it will be seen that with the carbon holder bars 101 mounted in such position on the carbon holder 97, suitable sheets of carbon paper or other similar inking mediums may be mounted on the bars 101 with the edge portions thereof bindingly engaged with the slots 105 as is best shown in Fig. 16, to thereby afford spaced carbon sheets between which the various leaves of a multileaf sales slip may be threaded. In my device, I prefer to have the bottom face of the carbon sheets 116 be the "inked" side thereon so that in assembling a multileaf sales slip in my novel machine, each of the various leaves of the sales slip is disposed below the respective carbon sheet from which the ink is transferred during a printing operation.

To hold the carbon holder bars 101 and the carbon sheet guard 112 in position on the bolts 107 and 108 I afford substantially C-shaped spring clips 118 at each end of the carbon holder bars 101, Figs. 8 and 14. The lower legs of the clips 118 are pivotally attached to the brackets 98 and 99 by suitable means such as pins 119, and the clips 118 may be swung inwardly and outwardly relative to the carbon holder bars 101 and the guard plate 112, to thereby swing the upper leg 121 into and out of downwardly pressing engagement with the upper surface of the guard plate 112. A screw 123 may be mounted in the upper leg 121 of the spring clips 118 to thereby afford means for readily adjusting the pressure of the spring clip on the top of the guard plate 112 and therefore on the stack of carbon holder bars 101.

It will be remembered that my novel sales recorder includes a box 42 in which a supply of sales slips S may be positioned. In my sales recorder 30 I prefer to use the continuous-form type of sales slip S in which two or more forms are interleafed and then folded in zig-zag relation so that the several slips may be disposed in the box 42 in stacked relation and the ends thereof may be threaded through the carbon holder 97 in the manner previously discussed, and the several slips may be simultaneously drawn out of the box 42 through the carbon holder 97 and forwardly across the tables F and T. A curved guard 125 is mounted on the lower end portion of the carbon holder 97, Figs. 4 and 16, and affords a gently curving guide member around which the forms in the box 42 may be pulled into and through the carbon holder 97.

Figure 21:
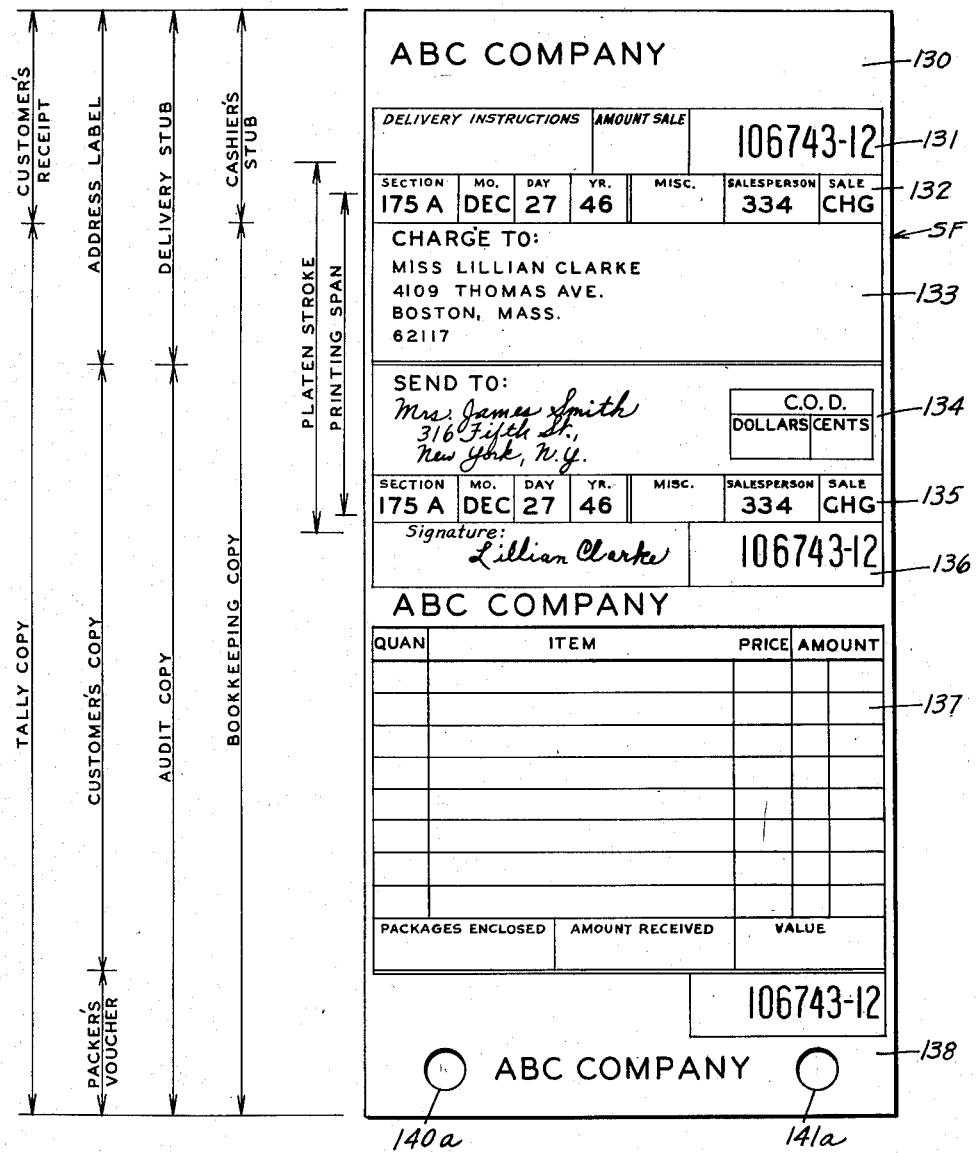
Fig. 21 is a top plan view of the type of form or sales slip which is especially well adapted for use in a sales recorder of the type shown in the aforementioned drawings.

When the forms S are mounted in operative position in the sales recorder 30, a plurality of identical forms such as that shown in Fig. 21 are disposed in stacked relation on the tables T and F, the forms SF being of such length that with one end thereof disposed adjacent to the front edge of the cover 63 of the housing 32, the other end thereof is disposed beneath the cover 61 adjacent to the carbon holder 97, to thereby properly position the form to receive a printing impression from the printing mechanism PM mounted in the cover 61, as will be discussed in greater detail presently, and to position the other end portion of the form SF on the table T within the outline of the frame 74 to thereby dispose this latter end portion of the form in position to receive written data thereon.

The forms which I prefer to use in my novel sales recorder 30 are substantially of the type shown in Fig. 21, wherein it will be seen that they embody a heading 130, seven data-receiving blocks 131–137, respectively, and a stub or voucher 138, disposed in aligned relation relative to each other. With respect to the form SF shown in Fig. 1, it will be seen that the blocks 132 and 135 are each intended to receive two sets of printed information which may be termed "relatively fixed printed data" and "semi-fixed printed data," respectively. It is not intended to convey the impression that the "relatively fixed printed data" are data which never change, but by the use of this term I intend to cover data which is normally fixed for a substantial period of time, such as, for example, at least a twenty-four hour period, and it will be seen that the left end portion of the blocks 132 and 135, as shown in Fig. 21, includes data that are normally not changed during a working day, this data including the number of the section of the store in which the sales recorder is used, and the day, month and year on which the entry is being made. The term, "semi-fixed printed data," is used to designate data which may or may not be changed between successive transactions recorded in the sales recorder, these data including such information as the serial number of the sales person making the sale and the type of sale, that is, whether the sale is a "charge," "cash," "C. O. D.," "will call," and the like.

Block 133 of the form SF, it will be seen, is intended to receive what may be termed "variable printed data," this block being afforded to receive from a suitable printing device such as a customer-carried identification token, or printing plate, the name and address and perhaps an identifying serial number, of the customer making the purchase, as will be discussed in greater detail presently.

The blocks 131, 134, 136 and 137 are intended to receive what may be termed, "variable written data," which is to be filled in by hand by the sales person making the transaction or by the customer to which a sale has been made. Thus, it will be seen, that block 131, in addition to embodying the fixed identifying serial number of that particular sales slip also includes spaces for receiving written instructions as to delivery of the purchase, and information indicating the amount of the sale. Block 134 includes space for indicating the name and address of the person to whom the purchase is to be mailed, and the "C. O. D." charges, if any. Block 136 includes the aforementioned identifying serial number of the particular sales slip, and, in addition, a space for receiving the written signature of the customer making the purchase. The block 137 comprises space for indicating the items purchased and the price thereof and the number of packages required, the value of the purchase made, and the amount of cash, if any, received from the customer in paying for the purchase, and affords a voucher which may, for example, be torn off in the shipping department to serve as a record of the package shipped.

When a sale or other transaction is to be recorded on a form SF in my novel sales recorder 30, the form SF is normally disposed in the housing 32 in such position that the block 137 thereof is disposed on the table T with the data-receiving portion thereof disposed within the outline of the opening in the frame member 74 of the front cover 63; and the blocks 130—136 disposed beneath the rear cover 61 with the block 136 disposed on the front edge portion of the table top 85 of the table T, and the blocks 132, 133 and 135 disposed in position to receive a printing impression from the printing mechanism PM during an operation of the latter, as will be discussed in greater detail hereinafter.

The carbon sheets 116 are preferably of such length that they extend from the carbon sheet holder 97 between the various sheets of the multi-leaf form SF disposed in operative position in the housing 32 and terminate in vertical alignment with the upper end portion of the stub 138, in spaced relation to the free end edge portion thereof.

For the purpose of holding a form SF in the aforementioned operative position in the sales recorder 30, I afford two pins 140 and 141, Figs. 3, and 4, which are engageable in openings 140a and 141a, Fig. 21, respectively, in the forms SF when the forms SF are disposed in normal data-receiving position. The fingers 140 and 141 are mounted on the rear edge portion of a finger bar 142 resiliently mounted in the body portion 34 of the housing 32 on leaf springs 143 and 144 mounted on the flanges 51 and 52 of the box 42, respectively, Figs. 3, 4, 7 and 13. A recess 145 is formed in the top surface of the finger bar 142, Figs. 1, 2 and 5, adjacent to the front edge of the front cover 63 of the housing 32. As is best seen in Fig. 5, the finger bar 142 is disposed substantially centrally of the flange 35a of the front wall 35 of the housing 32 and the top wall of the finger bar 142 is disposed substantially flush with the upper surface of the flange 35, Figs. 1 and 2.

It will be seen that when it is desired to advance a form, such as the form SF forwardly through the housing 32 of the sales recorder 30, the sales person or other operator may place his fingers in the opening 145 and by depressing the finger bar 142, move the pins 140 and 141 out of holding engagement with the form SF, and, with the finger bar 142 so depressed, may grasp the bottom or leading edge of the form SF which normally projects slightly from the front cover 63 and, by pulling outwardly on the form SF, advance the form through the housing 32 until the openings in the next form SF are disposed in registration with the pins 140 and 141, whereby the pins 140 and 141 are permitted to spring upwardly through the openings in this next form and hold the form against further outward movement. The extracted form SF may then be torn from the following form and the various copies of the sales slip may be separated and distributed in the usual manner, the sales clerk's record copy normally being placed in the chamber 45.

As is best seen in Figs. 1, 7 and 11, the brackets 98 and 99 on which the carbon holder 97 is mounted have notches or recesses 147, formed in the upper edges thereof for supportingly receiving the outer end portions of the shaft 149 of a platen roller 151. The body portion 152 of the platen roller 151, Figs. 2 and 4, is normally disposed between the brackets 98 and 99, and the outer end portions of the shaft 149 project outwardly from the brackets 98 and 99. Two collars 154 and 155, Fig. 2, having substantially V-shaped grooves 156 and 157 formed in the peripheral edge portions thereof, are mounted on the outer end portion of the shaft 149 between the brackets 98 and 99 and the side walls 38 and 39 of the housing 32, respectively.

As will be discussed in greater detail presently, the printing mechanism PM mounted in the cover 61 includes parts engageable with the collars 154 and 155 in the grooves 156 and 157 for moving the platen roller 151 longitudinally of the housing 32 through a printing operation.

The printing mechanism PM includes a base plate 161, Figs. 1, 2, 4 and 5, supported at the rear edge portion thereof by two screws 163 and 164 from the top wall 65 of the rear cover 61, and at the front end portion thereof by two screws 166 and 167 extending through the side walls 67 and 68 of the rear cover 61. The screws 163 and 164 which extend through the top wall 65 of the rear cover 61 are threadedly engaged with bosses 168 and 169 mounted on ears 171 and 172, respectively, projecting rearwardly from the rear edge portion of the base plate 161, Figs. 2, 4 and 5. The screws 166 and 167, which project through the side walls 67 and 68 of the rear cover 61 are threadedly engaged in two side walls 173 and 174, Figs. 1, 4 and 5, of the base plate 161, the side walls 173 and 174 projecting downwardly from opposite side edges of a top wall 175 of the base plate 161 which is held by the screws 163, 164, 166 and 167 in the rear cover 61 in parallel spaced relation to the top wall 65 of the rear cover 61.

Two pins 177 and 178, Figs. 1, 2 and 4 project inwardly from ears 179 and 180, Figs. 1 and 4, which project downwardly from the front edge portions of the side walls 173 and 174, respectively, of the base plate 161. Two manually operable latches 182 and 183, Figs. 1, 4 and 5, are pivotally mounted on pins 185 and 186, Figs. 2 and 5, extending through the side walls 38 and 39 of the body portion 34 of the housing 32, suitable spacing sleeves 187 and 188 being mounted on the pins 185 and 186, respectively, to hold the latches 182 and 183 in the desired spaced relation to the aforementioned side walls 38 and 39 of the body portion 34 of the housing 32. The latch members 182 and 183 are substantially L-shaped and project upwardly from the pins 185 and 186 through slots 190 and 191, Fig. 5, in the forward edge portion of the top wall 175 of the base plate 161, and embody a forwardly projecting handle portion 192 and 193 which projects outwardly through slots 194 and 195 formed in the front wall 66 of the cover 61, Fig. 3, the slots 194 and 195 opening downwardly through the lower edge of the front wall 66.

Two notches 196 and 197 are formed in the rear edge portions of the latch members 182 and 183 and are adapted to latchingly engage the pins 177 and 178 on the base plate 161 when the rear cover 61 is disposed in normally closed position on the body 34 of the housing 32, tension coil springs 198 and 199 connected between the lower end portions of the latch members 182 and 183 and pins 198a and 198b on the side walls 38 and 39 of the housing 34, Figs. 1 and 4, normally yieldingly urging the latch members 182 and 183 into such latching engagement with the pins 177 and 178.

A shaft 201 is rotatably mounted in a sleeve 202 fixedly mounted in the upper end portions of the supporting posts 55 and 56, and extends through the rear edge portions of the side walls 173 and 174 of the base plate 175, Figs. 1, 2 and 4. Two collars 203 and 203a are mounted on and secured to the shaft 201 between the side walls 173 and 174, and are secured to the side walls 173 and 174 by suitable means such as welding.

Two elongated hinge plates 204 and 205, Figs. 1, 2 and 4, are mounted on the shaft 201 and welded to the sides of the sleeves 203 and 203a opposite the sides secured to the side walls 173 and 174, respectively, of the base plate 161. The two hinge plates 204 and 205 are substantially identical in size and shape and have elongated slots 206 and 207 formed therein, respectively, Figs. 1 and 4, which slots 206 and 207 include serrated front end portions 206a and 207a and arcuate shaped rear end portions 206b and 207b, respectively. The elongated slots 206 and 207 are so disposed in the hinge plates 204 and 205 that when the platen roller 151 is disposed in the aforementioned normal position in the brackets 98 and 99, the outer end portions of the shaft 149 of the platen roller 151 are disposed in and project outwardly through the respective slots 206 and 207 in that portion of the arcuate shaped portions 206b and 207b adjacent to the junction of the arcuate shaped portions 206b and 207b with the serrated portions 206a and 207a, respectively. The serrated end portions 206a and 207a of the slots 206 and 207 project forwardly from the aforementioned normal position of the roller 151 in substantially parallel relation to the base plate 161 and the top wall 65 of the rear cover 61, and affords means for guiding the movement of the platen roller 151 during a printing operation of the printing mechanism PM as will be discussed in greater detail presently. As is best seen in Figs. 1 and 4, the arcuate shaped portions 206b and 207b of the slots 206 and 207 curve downwardly and rearwardly from the normal position of the platen roller 151 and enables the rear cover 61 and the hinge plates 204 and 205, attached thereto through the base plate 161, to be pivoted upwardly from the normally closed position shown in Fig. 1 to an open position such as shown in Fig. 4, without disturbing the normal positioning of the platen roller 151.

As is best seen in Fig. 5, two elongated slots 208 and 209 are formed in the top wall 175 of the base plate 161 and extend parallel to and relatively closely adjacent to the side walls 173 and 174 of the base plate 161. A substantially rectangular shaped slide 211, Figs. 2, 4 and 5 is mounted on the top face of the top wall 175 of the base plate 161 and has two brackets or ears 212 and 213 which project downwardly through the slots 208 and 209. Notches or recesses 215 and 2.6 are formed in the lower end portions of the brackets 212 and 213 on the slide 211 and are so positioned therein that with the platen roller 151 and the slide 211 disposed in the normal positions shown in Figs. 1 and 5, the brackets 212 and 213 extend downwardly over the collars 154 and 155 on the shaft 149 of the platen roller 151 with the grooved portions 156 and 157 of the collars 154 and 155 disposed in the recesses 215 and 216 in the brackets 212 and 213. Thus, it will be seen that a drive connection is thereby established between the slide 211 and the platen roller 151 whereby if and when the slide 211 is moved longitudinally across the base plate 161, the brackets 212 and 213 slide through the slots 208 and 209, and the platen roller 151 may be caused to roll through the serrated end portions 206a and 207a of the slots 206 and 207 in the hinge brackets 204 and 205. This, as a matter of fact, as will be discussed in greater detail presently, is what happens during a printing operation of the printing mechanism PM, the platen roller being caused to reciprocate in the serrated end portions 206a and 207a of the slots 206 and 207 through a printing operation.

To effect this movement of the slide 211 and the resultant movement of the platen roller 151, I afford a handle 220, Figs. 2 and 5, having one end portion thereof pivotally mounted on the top wall 175 of the base plate 161 by means of a pin 221, Fig. 5, which extends through a slot 222 formed in the top wall of the slide 211 adjacent to and parallel to the end of the slide 211 on which the bracket 212 is disposed. A bell crank 224 having two legs 225 and 266, is pivotally mounted on the top wall 175 of the base plate 161 by means of a pin 227 which extends through a slot 228 formed in the top wall of the slide 211 in parallel relation to the slot 222 and adjacent to and parallel to the end of the slide 211 on which the bracket 213 is disposed. The free end portion of the leg 225 of the bell crank 224 is pivotally connected to the mid-portion of the handle 220 by means of a link 230 connected at one end by a pin 231 to the free end portion of the leg 225 and connected at the other end thereof by a pin 232 to the central portion of the handle 220. The free end portion of the leg 226 of the bell crank 224 is connected by a pin 233 to one end of a link 234, the other end of the link 234 being connected by a pin 235 to the rear edge portion of the slide 211. The other end portion of the handle 220 opposite the end attached by the pin 221 to the slide 211, projects outwardly through an elongated slot 237 formed in, and extending substantially the length of, the side wall 68 of the rear cover 61, Figs. 2 and 5. A knob or hand grip 238 is mounted on this outwardly projecting end of the handle 230 and affords a member which may be readily gripped by an operator for moving the handle 230 longitudinally of the slot 237 around the pin 221.

Such movement of the handle 220, it will be seen, may be effected between the normal position shown in solid lines in Fig. 5 to the actuated position shown in broken lines therein. As will be seen in Fig. 5 when the handle 220 is disposed in the normal position shown in solid lines therein, the link 230, the bell crank 224, and the link 234 are so positioned that the slide 211 is held in the rearwardly disposed position shown in solid lines in Fig. 5, in which position the platen roller 151, which is engaged by the brackets 212 and 213, is disposed in the normal position shown in Figs. 1 and 4. Upon movement of the handle 220 from the position shown in solid lines in Fig. 5 to the position shown in broken lines therein, it will be seen that the link 230 is moved with the handle 220 and causes the bell crank 224 to pivot in a counter-clockwise direction as viewed in this figure which is thereby effective to move the link 234 from the solid line position shown in Fig. 5 to the broken line position shown therein and, the link 234 being pivotally connected to the slide 211, such movement of the link 234 is effective to move the slide 211 forwardly from the position shown in solid lines to the position shown in broken lines in Fig. 5, in which latter position the forward end portion of the slide 211 projects outwardly through an elongated slot 240 formed in the front wall 66 of the rear cover 61, Figs. 3 and 6. This forward movement of the slide 211 is effective to similarly move the platen roller 251, the brackets 212 and 213 through their interconnection with the collars 154 and 155 on the shaft 149 of the platen roller 151 being effective to roll the outer end portions of the shaft 149 upwardly out of the recesses 147 in the brackets 98 and 99 into the forward end portions 206a and 207a of the slots 206 and 207 and thence forwardly along the forward end portions 206a and 207a into the position shown in Fig. 6. As previously mentioned the forward end portions 206a and 207a of the slots 206 and 207, are serrated, each having three upwardly projected lugs or teeth 242, 243 and 244, disposed in longitudinally spaced relation to each other, the lugs 242 and 244 being spaced from the lug 243 by recesses 246 and 247. As will be discussed in greater detail presently, the lugs or raised portions 242–244 in the slots 206 and 207 are so disposed therein that the roller 151 in traversing the forward end portions 206a and 207a of the slots 206 and 207 during a printing operation of the printing mechanism PM are raised by the lugs 242–244 in the proper positions to press sales slips or forms SF disposed in operative position in the sales recorder 30 into impression receiving relation to printing devices carried by the cover 61 above the sales slips.

As an integral part of the printing mechanism PM, and for supporting printing devices in the rear cover 61, a supporting plate 246, Figs. 4 and 8 is resiliently mounted on, and suspended from the base plate 161 by four screws 247–250, Figs. 8 and 9, springs 252 being disposed around the screws 247–250 between the base plate 161 and the supporting plate 246 to thereby yieldingly urge the supporting plate 246 and the base plate 161 away from each other. As will be discussed in greater detail presently, suitable printing means may be mounted on the lower face of the supporting plate 246 to print the data desired to be printed on a sales slip or form SF during an operation of my novel sales recorder. It will be remembered that the data which it is desired to print on the sales slips during an operation of my sales recorder comprises the "relatively fixed data" such as the section number, month, day and year of the transaction, which is printed in two places on the sales slip namely, in blocks 132 and 135, Fig. 21; the "semi-fixed printed data" such as, for example, a serial number of the sales person making the transaction and the type of sale made which is also printed in two places on the sales slip, namely, in the other end portions of the blocks 132 and 135 opposite to the end portions in which the "relatively fixed data" is printed; and the variable printed data, such as, for example, the name, address and identifying serial number of the customer to whom the sale was made, which it is desired to print in one place on the forms SF, namely, in the blocks 133.

For the purpose of holding type characters for making the impression for printing the aforementioned "relatively fixed data," a block 254, Figs. 8 and 12, is mounted on the lower face of the supporting plate 246 by suitable means such as screws 255. Two elongated substantially T-shaped grooves 258 and 259 are formed in the lower face of the block 254 in parallel spaced relation to each other and are adapted to receive individual type characters, or slugs embodying a plurality of type characters, bearing the "relatively fixed data" which it is desired to print in the blocks 135 and 132, respectively. The grooves 258 and 259 are so spaced on the block 254, and the block is so positioned on the supporting frame 246 that the type characters 261 and 262 are disposed vertically above the position normally occupied by the portions of the blocks 135 and 132 on which it is desired to impress the data carried by the type characters 261 and 262. The slots 258 and 259 are open at their ends whereby the type characters 261 and 262 may be readily inserted thereinto and removed therefrom when the cover 61 is moved to upwardly disposed position, such as that shown in Fig. 4. However, it will be appreciated that in the normal operation of my novel sales recorder 30, it is not normally necessary to change the type characters 261 and 262 very often, usually not more than once each working day, it being necessary, of course, to change the day of the month each twenty-four hours and if the sales recorder should be transferred from one section to another it will be necessary, of course, to change the section number at that time.

For the purpose of printing the "variable printed data," each customer of a store using a sales recorder of the type disclosed herein, will normally be supplied with a printing plate or identification token of the type wherein the type characters forming the name, address, identification number, and other pertinent data relative to the customers, are formed in the plate. Between the grooves 258 and 259 in the block 254, relatively thin sheet metal flanges 264, 265 and 266, Figs. 3 and 12, are mounted on the lower face of the blocks 254 and project downwardly therefrom to define a substantially U-shaped printing plate-receiving area, the flange 266 forming the bight of the U and the flanges 264 and 265 forming the side legs thereof. The flanges 264–266 each have an inwardly projecting lip 264a, 265a and 266a spaced from the lower face of the block 254 for the reception of the edge portions of a printing plate 270 of the type heretofore discussed. As previously mentioned, the printing plate 270 bears the desired data concerning the customer which it is desired to print in the block 134 of the sales slip SF, these data comprising such information as the name, address and identifying number of the customer. It will be seen, that the end portion of the U-shaped recess defined by the flanges 264–266, opposite the flange 266 and adjacent to the edge of the supporting plate 246 disposed closest to the wall 67 of the rear cover 61, is open to thereby permit a printing plate such as the plate 270 to be readily slid into or out of position between the flanges 264–266.

The "semi-permanent data," which it is desired to print on the forms SF, include data such as the serial number or other identifying number of the person making the sale, and the type of sale, that is, whether the sale was "cash," "C. O. D.," "charge" or "will call." It will be remembered that it is desired to print this latter data in two places, namely, in the end portions of the blocks 132 and 135 on the form SF, opposite the ends in which the "relatively fixed data" is printed. For the purpose of holding type characters suitable to make the impressions required for printing these "semi-permanent data," I have embodied in my novel sales recorder 30, two printing device holders 272 and 273, Figs. 8 and 9. The printing device holder 273, comprises a supporting strip 274 mounted on the top face of the supporting plate 246, Fig. 9, and having two supporting blocks 276 and 277 mounted on the lower face of opposite ends of the strip 274 by suitable means, such as screws 278 and 279. The blocks 276 and 277 have upwardly projecting bosses 281 and 282 which project through slots 283 and 284, respectively, in the supporting plate 246, the screws 278 and 279 being inserted into the bosses 281 and 282, respectively. Thus, it will be seen that the holder 273, including the blocks 276 and 277 and the supporting strip 274 may be slid on the supporting plate 246 longitudinally of the slots 283 and 284. Two printing plates 286 and 287 are mounted on the lower faces of the blocks 276 and 277, respectively, and are held therein by suitable means, such as screws 289. The printing plates 286 and 287 embody the type characters 291 and 292, respectively, for making the impression of the "semi-permanent printed data" relative to the type of purchase or sale made, which it is desired to print in the blocks 132 and 135.

It will be seen, that these last mentioned "semi-permanent printed data" include four possibilities, namely, "charge," "will call," "C. O. D.," or "cash," and as shown in Figs. 8 and 9, these four notations are each disposed in a separate line on the printing plates 286 and 287. The blocks 276 and 277 are so disposed on the supporting plate 246 that the type characters which are disposed in that position occupied by the "CHG." type characters shown in Figs. 8 and 9, are effective to impress the datum carried thereby onto the form SF disposed in operative position in the housing 32, when the platen roller 151 rides onto the lugs 244 and 242, respectively. For the purpose of shifting the blocks 276 and 277 along the supporting plate 246 to thereby vary the position of the notations carried by the printing plates 286 and 287, to selectively print any one of the four notations, a substantially U-shaped handle 294 is mounted on the supporting strip 273, one leg 295 of the handle 294 being attached to the strip 273 by the screw 279, and the other leg 296 of the handle 294 projecting along, in parallel, closely adjacent relation to the top wall 65 of the cover 66. A button 297 is mounted on the free end portion of the leg 296 of the handle 294 and projects upwardly through a slot 298 in the top wall 95 of the cover 66. The slot 298 is of the same length and extends parallel to the slots 283 and 284 in the supporting plate 246, and thus, it will be seen that by moving the button 297 along the slot 298, the printing device holder 273 may be moved on the supporting plate 286 along the slots 283 and 284, to thereby vary the position of the type characters 291 and 292 mounted on the blocks 276 and 277. Suitable indicia 301, Fig. 7 may be afforded on the top wall 65 of the cover 61 adjacent to the slot 298 for indicating the proper position of the button 297 for disposing the type characters on the printing plates 286 and 287 in the proper position to make the desired impressions during an operation of my machine.

The handle 294 by which the printing device holder 273 may be moved, is preferably made of suitable resilient material, such as, for example, spring steel and the end portion of the leg 295 opposite to the end attached to the leg 296 preferably extends beyond the screw 279 to afford a leaf spring 303 which rests upon a ball 304 mounted in an opening 305 in the supporting plate 246 between the blocks 276 and 277. Four openings 307 extending through the strip 274 in spaced relation to each other longitudinally thereof, are engageable with the lower face of the ball 304 mounted in the opening 305. The openings 307 are so spaced along the strip 274 that upon movement of the printing device holder 273 by the handle 294 along the supporting plate 246, the ball 304 is snapped into each of the openings 307 by the spring 303 for a corresponding printing position of the blocks 276 and 277. This, it will be seen, enables the sales person to readily sense when the printing device holder 273 is mounted in proper printing position.

The printing device holder 272 is constructed substantially the same as the printing device holder 273, and the same reference numerals, with the suffix "a" added thereto, are used in the drawings to indicate parts of the printing device holder 272 which are the same as parts embodied in the printing device holder 273. The only substantial change between the printing device holder 272 and 273 is that instead of using printing plates, such as the printing plates 286 and 287 embodied in the printing device holder 273, it is desirable that the type characters 291a and 292a on the blocks 276a and 277a be mounted in grooves 312 and 313, respectively, in the lower faces of the blocks 276a and 277a which are of the same construction as the grooves 258 and 259 in the block 254. In this manner, the type characters 291 and 292a which comprise the identification numbers of the sales person making the transaction, may be readily changed in the same manner that the type characters 261 and 262 are changed in the event that one sales person is substituted for another in the department in which the particular sales recorder 30 is being used.

Like the printing device holder 273, the printing device holder 272 embodies a handle 294a which includes a button 297a projecting upwardly through a slot 298a in the top wall 65 of the cover 61. Suitable indicia 301a may be provided adjacent to the slot 298a to indicate the position of the printing device holder 272, to thereby indicate on the cover 61, the sales person's identifying data which will be printed during an operation of the machine. It will be appreciated that the sales person, may, by moving the button 297a to the proper position opposite the proper indicia, change the setting of the printing device holder 272 to print his or her particular identifying number.

Operation

In a typical operation of the sales recorder 30 embodying the principles of my invention, when a customer makes a purchase from a sales person, that sales person writes, in long-hand the identification of the items purchased, the number of such items, the prices of the items, and the total amount in the block 137 on the form SF disposed in operative position on top of the tables F and T in the housing 32. Thereafter, the sales person procures from the customer the identifying printing plate or customer token 270 with which the customer has previously been supplied and, after releasing the latches 182 and 183 and raising the cover 65, inserts the token 270 in printing position in the flanges 264–266.

Previously, at the start of the day, proper type characters 261 and 262 have been inserted in the slots 258 and 259 in the block 254 and, therefore, it is unnecessary to make any changes in the type characters carried in these slots 258 and 259.

By applying his or her pencil to the top sheet leaf of the form SF through the window 134a in the carbon guard 112, the sales person may then write any information desired to be shown in the block 134 such as, for example, the name and address of the person to whom the package is to be mailed. The customer may then be permitted to sign the form in the block 136.

Thereafter, the sales person may close the cover 61 into the operative position shown in Fig. 1, and pull the knob 238 of the handle 220 from the position shown in solid lines in Fig. 5, forwardly to the position shown in broken lines therein, which as previously mentioned is effective to move the platen roller 151 forwardly along the forward end portions 206a and 207a of the slots 206 and 207.

During such movement of the platen roller 151, the roller rides up onto the lugs 242—244 and down into the valleys 246 and 247. The lugs 242—244 and the valleys 246—247 are so positioned along the slots 206 and 207 that as the platen roller advances into alignment with the type characters 292, 292a and 261 from which it is desired to make an impression on the forms SF, the platen roller 151 is disposed on the top of the lugs 242, but when between this desired printing position and the position directly underneath the type characters on the printing plate 270, the roller drops down into the valleys 246 to thereby move away from the other type characters 292 and 292a carried by the supporting plate 246 and prevent printing therefrom. As the platen roller 151 comes into alignment with the type characters on the printing plate 270, the roller 151 again rides onto the lug 143 to thereby press the block 133 of the form SF against the type characters on the printing plate 270 and then moves down into the valley 247 until the platen roller 151 is disposed beneath the type characters 291, 291a and 262 from which it is desired to make an impression, at which time the platen roller rolls up onto the lugs 244.

Thus, it will be seen that during the movement of the platen roller 151 along the forward end portions 206a and 207a of the slots 206 and 207, the roller 151 is selectively moved upwardly and downwardly relative to the printing devices carried by the supporting plate 254 to thereby move the platen roller 151 into engagement with type characters disposed in printing position, but to move the platen roller downwardly out of printing relation with respect to all other type characters carried by the supporting plate 246.

The carbon guard 112, as is best seen in Fig. 10, has a series of openings 132a–136a corresponding in position to the blocks 132–136 on the form SF, respectively, through which the appropriate printed and written data may be impressed on the proper positions on a sales slip SF disposed in operative position in the sales recorder 30.

Also it will be noted that, as best seen in Fig. 6, as the platen roller 151 is moved forwardly along the slots 206 and 207, the top 85 of the flexible table F is bent downwardly thereby, the roller 151 passing between the table F and the sales slip SF disposed in data-receiving position thereon.

After moving the handle from the position shown in solid lines to that shown in broken lines in Fig. 5, the operator may return the handle to the normal position shown in solid lines in Fig. 5, and by pressing down on the finger bar 142 and grasping the projecting edge of the form SF adjacent to the front cover 63, may pull the completed form SF forwardly out of the housing 32 until the pins 140 and 141 snap upwardly into the registration openings 140a and 141a in the following form SF. Thereafter, the sales person may separate the various copies of the form SF giving the customer the necessary copy thereof and placing the other copies thereof in the storage chamber 45 below the box 42.

From the foregoing, it will be seen that I have afforded a novel sales recorder wherein the printing mechanism and the platen roller actuating mechanism are embodied in a hinged cover of the sales recorder in a novel and expeditious manner.

Also, it will be seen that I have afforded a novel sales recorder wherein the necessary printing and writing operations desired in the recorded copy of a sales transaction may be quickly and easily made.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A sales recorder comprising a body member, a table mounted in said body member for supporting sales slips in position for the entry of information thereon, a cover member hingedly mounted on said body member for pivotal movement between a closed position and open position relative thereto, said body member having a supply compartment therein beneath said table for housing a supply of sales slips in endless and connected form and from which compartment the leading sales slip may be drawn upwardly adjacent the pivotal axis of said cover and then over said table so as to be positioned on said table, said cover overlying a portion of said table when in said closed position, printing means mounted in said cover, elongated guide means mounted in said cover, a platen roller mounted in said guide means and movable therealong for pressing such sales slips mounted in said position on said table into operative engagement with said printing means, when said cover is in said closed position, said guide means including elements operable to continuously maintain said platen roller in a predetermined rest position beneath the level of said table while said cover is moved between open and closed positions, and manually operable means mounted in said cover and operatively engageable with said platen roller when said cover is in its closed position for moving said platen roller along said guide means.

2. A sales recorder comprising a body member, a table mounted in said body member for supporting sales slips in position for the entry of information thereon, a cover member hingedly mounted on said body member for pivotal movement between a closed position and open position relative thereto, said cover overlying a portion of said table when in said closed position, type characters mounted in said cover, guide members mounted in said cover, said guide members having elongated guide slots therein, said guide slots extending below such sales slips mounted in said position on said table, a platen roller mounted in said guide slots below said sales slips for movement therealong, said guide slots having serrations therein for moving said roller toward predetermined ones of said type characters to thereby press said sales slips against said predetermined ones of said type characters, and manually operable means mounted in said cover and operably engaged with said platen roller when said cover is in said closed position for moving said roller along said slots.

3. In a sales recorder of the type having a body member, a cover member mounted on the body member, and means in said body member for holding a supply of sales slips, a base plate mounted in said cover, printing means having type characters thereon mounted on said base plate and disposed therebelow, guide means mounted in said cover and projecting below said base plate, a platen roller mounted in said guide means and movable therealong in closely adjacent relation to said type characters for pressing such sales slips into impression receiving relation to said type characters, said base plate having elongated guide slots therein, a slide plate movably mounted on said base plate on the opposite side thereof from said printing means, lug members mounted on said slide plate and projecting through said guide slots for guiding said slide plate in a predetermined direction during movement of said slide plate relative to said base plate, said lugs being operatively engaged with said roller for moving said roller along said guide means upon movement of said slide plate in said predetermined direction, and means pivotally connected to said base plate and said slide plate for moving said slide plate in said predetermined direction on said base plate.

4. A sales recorder comprising a body member within which a supply of sales slips may be positioned, a table mounted on said body member on which a sales slip is positioned for the entry of information thereon, a cover, means for hingedly connecting said cover to said body member for movement between an opened and a closed position relative to said body member, said means comprising two hinge plates mounted on said cover member in parallel spaced relation to each other and pivotally mounted in said body member, said plates having parallel elongated guide slots therein, a platen roller movably mounted in said plates below said sales slip with the opposite end portions of said roller mounted in said guide slots in respective ones of said plates for reciprocation along said guide slots in engagement with the lower surface of said sales slip, bracket means mounted on said body member and engageable with said roller for normally holding said roller in a predetermined position relative to said housing, printing means mounted in said cover member above said sales slip, said printing means including type characters directed toward said sales slip, and means connected to said roller when said cover is in said closed position for moving said platen roller along said guide slots below said sales slip away from and toward said bracket means to thereby press said sales slip into impression-receiving engagement with said type characters.

5. A sales recorder comprising a body member within which a supply of sales slips may be positioned, a table mounted on said body member on which a sales slip is positioned for the entry of information thereon, a cover, means for hingedly connecting said cover to said body member for movement between an opened and a closed position relative to said body member, said means comprising two hinge plates mounted on said cover member in parallel spaced relation to each other and pivotally mounted in said body member, said plates having parallel elongated guide slots therein, a platen roller movably mounted in said plates below said sales slip with the opposite end portions of said roller mounted in said guide slots in respective ones of said plates for reciprocation along said guide slots in engagement with the lower surface of said sales slip, bracket means mounted on said body member and engageable with said roller for normally holding said roller in a predetermined position relative to said housing, printing means mounted in said cover member above said sales slip, said printing means including type characters movably mounted on said cover over said sales slip for selective movement into predetermined positions, and means connected to said roller for reciprocating said roller along said guide slots, said guide slots having upwardly and downwardly projecting portions for raising and lowering said roller into and out of printing engagement with said type characters during said reciprocation of said roller, said upwardly projecting portions being positioned relative to said cover so as to raise said roller under said type characters disposed in said predetermined positions to thereby press said sales slips into impression receiving engagement with said last mentioned type characters.

6. A sales recorder comprising a body member within which a supply of sales slips may be positioned, a table mounted on said body member on which a sales slip is positioned for the entry of information thereon, a cover, means for hingedly connecting said cover to said body member for movement between an opened and a closed position relative to said body member, said means comprising two hinge plates mounted on said cover member in parallel spaced relation to each other and pivotally mounted in said body member, said plates having parallel elongated guide slots therein, a platen roller movably mounted in said plates below said sales slip with the opposite end portions of said roller mounted in said guide slots in respective ones of said plates for reciprocation along said guide slots in engagement with the lower surface of said sales slip, bracket means mounted on said body member and engageable with said roller for normally holding said roller in a predetermined position relative to said housing, printing means mounted in said cover member above said sales slip, said printing means including type characters directed toward said sales slip, and means operatively connected to said roller when said cover is in said closed position for moving said platen roller along said guide slots below said said sales slip away from and toward said bracket means to thereby press said sales slip into impression-receiving engagement with said type characters, said means for moving said platen roller being connected to said cover and movable therewith out of said operative connection to said roller when said cover is moved from said closed to said opened position.

7. A sales recorder comprising a body member in which a supply of sales slips may be located, a flexible writing table across the surface of which the sales slips may be fed one by one for the manual entry of data thereon, said table being mounted on said body member for up and down flexing movement, a cover member connected to said body member for up and down pivotal movement, printing means mounted in said cover to be disposed over a sales slip on said table for printing such a sales slip when said cover is in the down position, and a platen mechanism including a platen roller mounted for printing movement in a forward direction to progressively press a sales slip up against said printing means when said cover is in the down position and for flexing said table down to an out-of-the-way position during said printing movement, said platen roller being normally disposed at the rear of said flexible table in an out-of-the-way position when said cover is up for the manual entry of data, means for locating said platen roller in between the top of said table and the bottom of the sales slip that is located on the table whereby movement of said platen roller in said forward direction will cause said table to be flexed down, and means for moving and guiding said platen roller in said forward direction beneath and in engagement with such a sales slip.

JOHN H. GRUVER.

REFERENCES CITED

The following references are of record in the file of this patent:

UNITED STATES PATENTS

| Number | Name | Date |
|---|---|---|
| 1,165,593 | Hand | Dec. 28, 1915 |
| 1,576,823 | Hayes | Mar. 16, 1926 |
| 1,822,344 | Gollnick | Sept. 8, 1931 |
| 2,092,026 | Schaefer | Sept. 7, 1937 |
| 2,102,787 | Christenson | Dec. 21, 1937 |
| 2,281,577 | Haynes | May 5, 1942 |
| 2,295,748 | Moore | Sept. 15, 1942 |
| 2,530,049 | Ekblom | Nov. 14, 1950 |